T. A. EDISON.
Speaking-Telegraph.
No. 203,013.    Patented April 30, 1878.
Fig. 1.    Fig. 2.
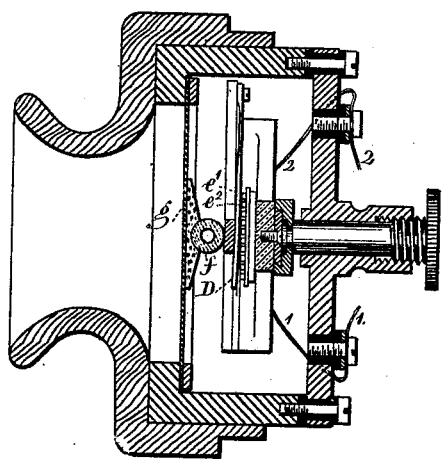
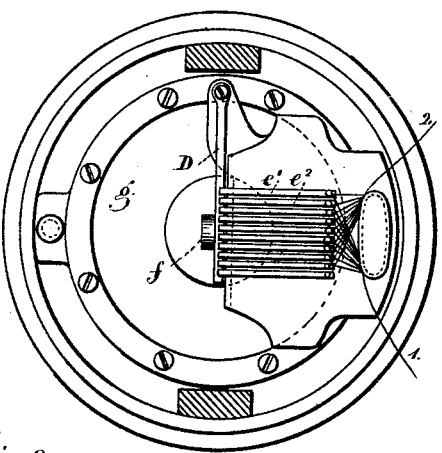
Fig. 3.
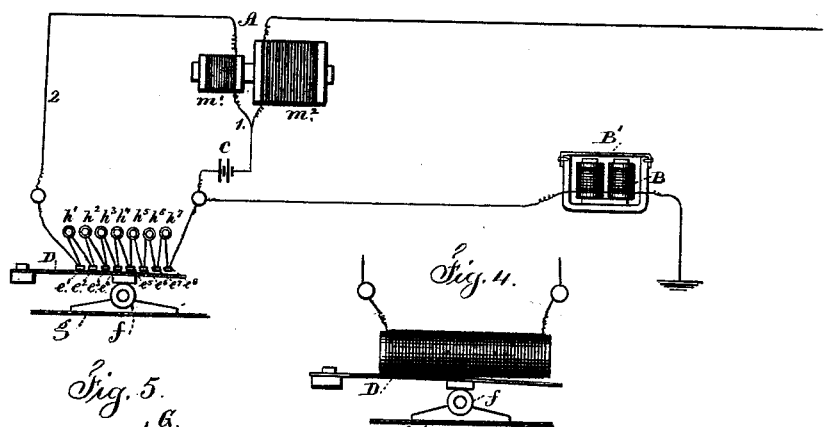
Fig. 5.    Fig. 4.
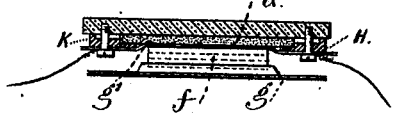
Fig. 6.
Witnesses
Chas H. Smith
Geo. T. Pinckney
Inventor
Thomas A. Edison
per Lemuel W. Serrell
atty

UNITED STATES PATENT OFFICE.

THOMAS A. EDISON, OF MENLO PARK, NEW JERSEY, ASSIGNOR TO WESTERN UNION TELEGRAPH COMPANY, OF NEW YORK, N. Y.

IMPROVEMENT IN SPEAKING-TELEGRAPHS.

Specification forming part of Letters Patent No. 203,013, dated April 30, 1878. Application filed December 13, 1877.

*To all whom it may concern:*

Be it known that I, THOMAS A. EDISON, of Menlo Park, in the county of Middlesex and State of New Jersey, have invented an Improvement in Speaking-Telegraphs, of which the following is a specification.

The object of this invention is to transmit and receive oral communications over telegraphic circuits.

This telegraph is operated by sound-vibrations. I make use of a rheostat with numerous contact-points and a conductor that is operated by the sound-vibrations, and serves to short-circuit the rheostat to a greater or less extent according to the amplitude of vibration. I interpose an elastic cushion between the conductor and the diaphragm or other body moved by sound, to prevent false vibrations, and I employ an induction-coil and a local circuit, arranged in such a manner that with a weak local battery, the line-current is augmented and the rise and fall of electric tension is in proportion to the sound-vibrations.

Figure 1 is a section of the instrument for transmitting; and Fig. 2 is a view at the rear of the diaphragm, showing the manner of winding the rheostat-wires. Fig. 3 shows the diagram of connections for one terminal station.

A is an induction-coil, consisting of one bar of iron and two coils, $m'$ and $m^2$, the latter being placed in the main line, in which the local battery $c$ and the receiver B also forms a part.

$m'$ is the primary inductive-magnet, of very low resistance, placed in a local circuit, 1 2, containing also the rheostat or resistance-coils, $h'$ $h^2$ $h^3$ $h^4$, &c.

$e'$ $e^2$ $e^3$ $e^4$, &c., are springs, each one being connected to the juncture between each resistance-coil. These springs $e'$ $e^2$, &c., are contiguous to the spring D, and when the spring D is moved it comes in contact with $e'$ just a little before it does with $e^2$, and so on. When $e'$ and $e^2$ are in contact with D the resistance $h'$ is cut out of circuit, and if $e^2$ and $e^3$ are in contact with D the resistance $h^2$ is cut out, and so on, and contact between all the springs and D cuts all the resistance out of circuit.

For very powerful effects the resistance of $m'$ should be less than one ohm, and the total resistance of $h'$ $h^2$, &c., about five ohms. Then the slightest movement of the spring D, when properly adjusted, will cause a great rise and fall in the strength of the magnetism in the core of $m'$, and a consequent powerful induced current will pass over the line and set the plate of the receiver at the distant station in vibration.

If the diaphragm $g$ is set in powerful vibration a greater number of springs $e$ $e'$, &c., come in contact with D, and a greater disturbance of the magnetism of the core of $m'$ takes place, transmitting a more powerful wave into the main line, which is in one direction when the diaphragm causes D to approach the springs, and in the contrary direction when it recedes therefrom, thus the strength of the waves sent into the main line are proportionate to the amplitude of vibration of the diaphragm.

I do not wish to confine myself to any particular arrangement of the springs $e'$ $e^2$ $e^3$, &c., as they may be arranged to radiate from a center, like a sunflower, around a metallic disk beveled in the proper manner and secured to the diaphragm, so as to come in contact with one after the other of the springs as the diaphragm approaches. It is not even necessary that the springs should be worked in a local circuit, as the resistance between each spring may be greatly increased and the transmitter inserted directly in the main line with the receiver and battery.

Fig. 4 is a modification of the rheostat. The same consists of a cylinder of insulating material having a thread cut in it from end to end and containing wound very fine platina wire, the total resistance of which may be five ohms. The forward movement of the diaphragm $g$ causes the spring D to short-circuit each convolution of the wire, one after the other, and thus decreases the resistance of the local circuit.

In Fig. 5 the wire-resistance is replaced by a semi-conductor, such as plumbago, at G, included in the local circuit, the connections being made by the metallic clamps K and H.

$f$ is a piece of rubber tube fastened to the diaphragm and faced with a thin piece of platina-foil, $g'$, which acts in the same manner as the spring D in Figs. 2, 3, and 4. The forward movement of the diaphragm causes more and more platina to come in contact with the plumbago, thus allowing the greater part of the current to pass through the platina, according to the amplitude of the diaphragm-vibrations. Of course other materials, such as silicon, boron, sulphides of the heavy metals, and other conducting chemical compounds, may be used, or even very thin strips of gold, platina, silver, and other metals may be used in the same manner as the plumbago.

In Fig. 6 the change in the resistance of the coil of wire takes place longitudinally, a spiral of insulated wires being arranged on a stud of insulating material, and compressed or allowed to expand by the movement of the diaphragm, thus causing the various convolutions to short-circuit one another.

By this construction of apparatus and arrangement of circuits I am enabled to transmit upon the line electric undulations proportionate to the length of line, so as to produce the proper response at the distant receiving-magnet B and diaphragm-armature B', because the rheostat will cause more or less resistance in the local circuit and the polarity of $m^2$ will alternate with the rise and fall of the electric tension in the local circuit, and the battery $c$, also being in the main line, will act to neutralize or augment the main-line current according to the polarity of that current and in proportion to the resistance of the local and main-line circuits, thus obtaining a powerful current on the line from a weak local current. The elastic cushion $f$, interposing between the diaphragm, or other article vibrated by the atmospheric sound-waves, and the short-circuiting conductors of the rheostat, prevents any musical vibrations of either D or $g$, and causes a gentle yielding movement and change of electric tension in proportion to the sound without risk of false vibrations.

I do not claim herein the disk of plumbago G shown in Fig. 5, as this is similar to that shown in my application No. 130; neither do I herein claim the sheet-iron diaphragm forming an armature to the electro-magnet, as that is shown in some of my former applications, and the resistance to the electric circuit is also varied by the motion of the diaphragm in said application No. 130. Therefore the same is not claimed herein.

I claim as my invention—

1. In a speaking-telegraph, the combination, with a diaphragm, of a rheostat or resistance-coils and a conductor vibrated by the diaphragm and acting to short-circuit more or less of the rheostat in proportion to the amplitude of the vibrations, substantially as set forth.

2. In combination with a diaphragm actuated by sound-vibrations and a metallic conductor, an elastic cushion, $f$, interposed between the diaphragm and said metallic conductor, to move the latter in proportion to the movement of the diaphragm, substantially as set forth.

3. In a speaking-telegraph, the combination, with the diaphragm and rheostat, of a local circuit and an induction-coil, substantially as set forth.

4. In a speaking-telegraph, an induction-coil, a rheostat, and a battery in a local circuit, and a main-line circuit passing through a second induction-coil and also through the battery, substantially as set forth.

Signed by me this 8th day of December, A. D. 1877.

THOS. A. EDISON.

Witnesses:
GEO. T. PINCKNEY,
CHAS. H. SMITH.